Patented Feb. 7, 1950

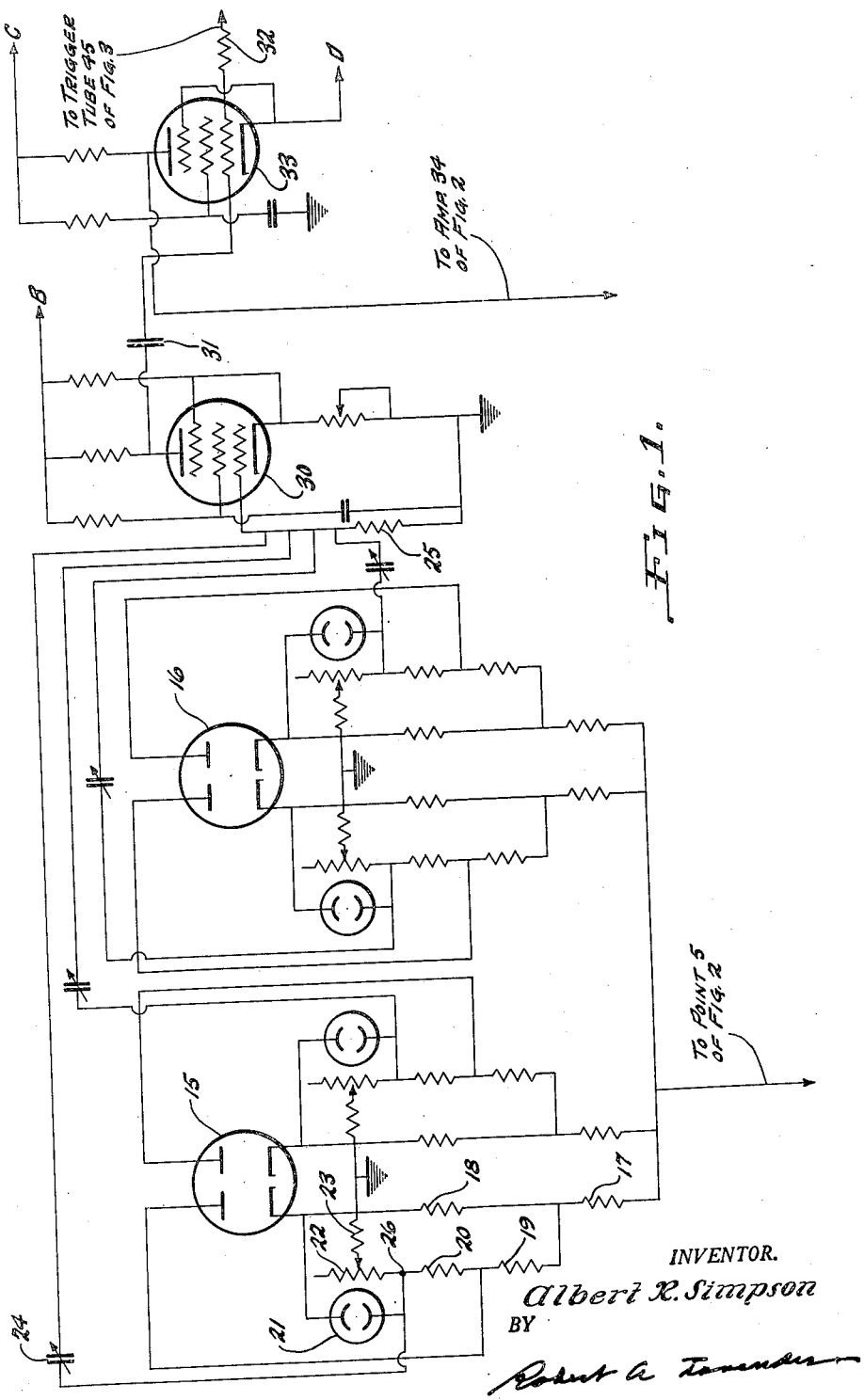

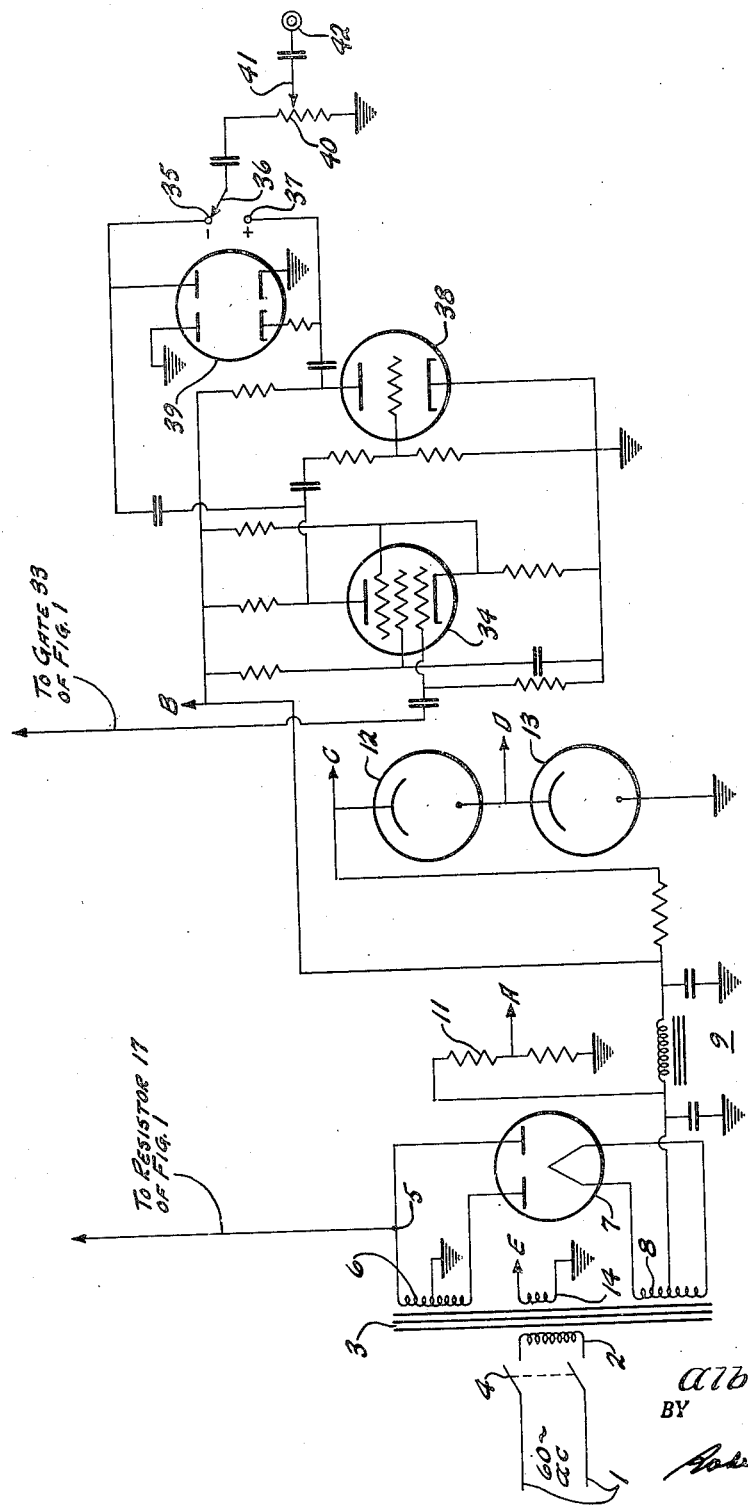

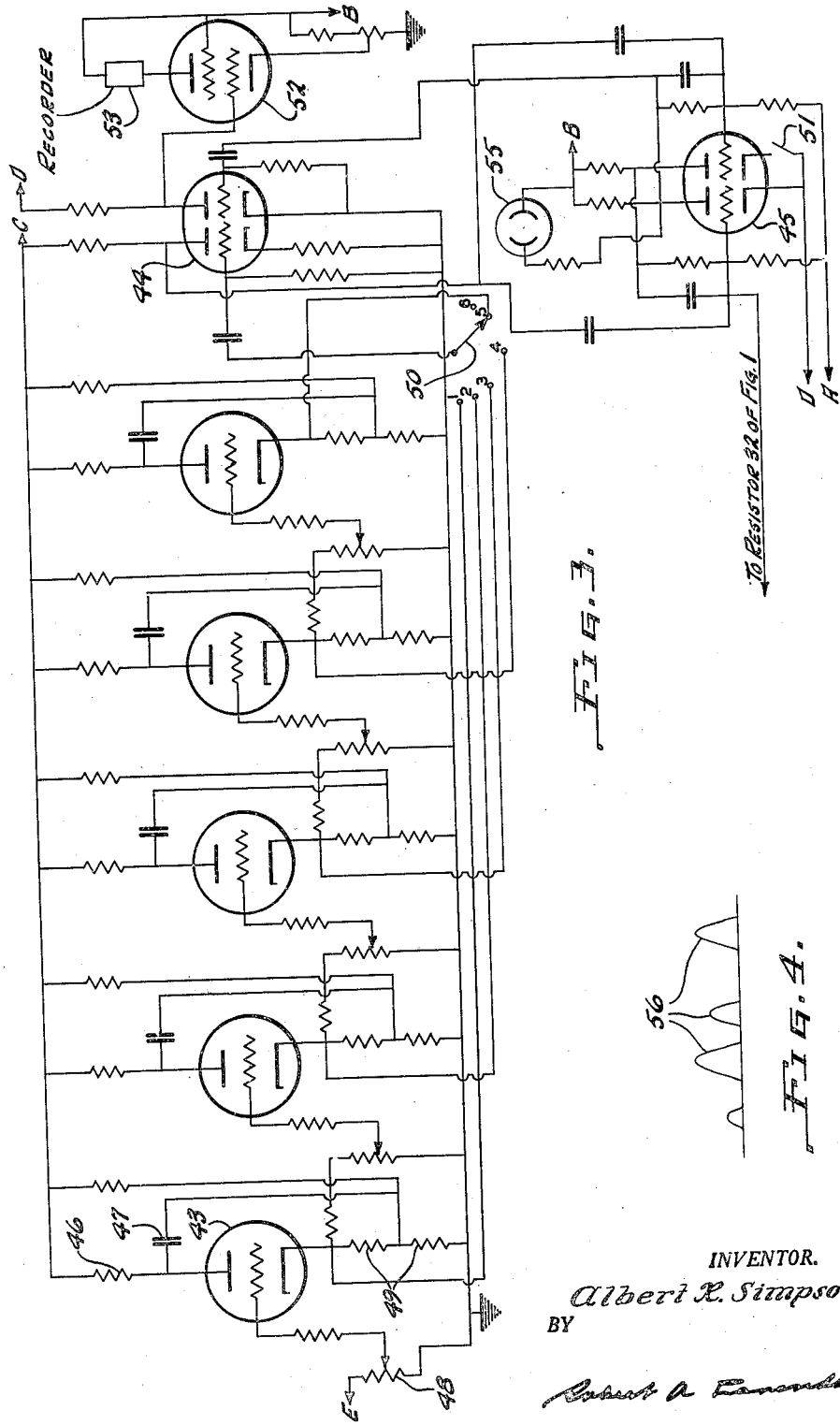

2,496,819

UNITED STATES PATENT OFFICE 2,496,819

PULSE GENERATOR

Albert R. Simpson, Knoxville, Tenn., assignor to the United States of America as represented by the United States Atomic Energy Commission Application February 4, 1946, Serial No. 645,463

11 Claims. (Cl. 250—36)

This invention relates generally to the art of pulse generators, and, more particularly, to a pulse generator for simulating the random pulses produced by a Geiger-Muller tube when such tube is subjected to electrical radiations, such as alpha or beta particles, such a random pulse generator being particularly adapted to testing, counting or scaler circuits.

It is a well known practice in the art to test such counting or scaler circuits by the application thereto of the output pulses from a conventional pulse generator. However, in the past the output of such pulse generator has comprised a series of uniform pulses of equal intensity and equal spacing, and in the test this series of uniform pulses has been applied for a known length of time. This method of testing counter circuits suffers from two main disadvantages. (1) If the line frequency controlling the pulse generator should vary during the test, the number of pulses applied to the counting circuit would also vary, and such variation would be at least quantitatively indeterminate. (2) The above system does not give the counter circuit a fair test corresponding to the conditions present under normal counting operation. This is true because of the fact that the pulses derived from the output of actual radiation detecting apparatus, such as a Geiger-Muller tube, are random as to height (amplitude) and spacing. Accordingly, a counter which would operate satisfactorily under the prior system of test might not operate satisfactorily under actual operating conditions.

In the present apparatus the first above-described disadvantage of the prior system is overcome by employing a pulse generator adapted to produce an accurately known number of pulses during one test irrespective of line frequency variations during the course of the test. This feature is obtained by having the timing device controlled from the line frequency in the same proportion as is the pulse generator, so that variations in line frequency during the test will respectively shorten or lengthen the time interval of the test to the same extent that the rate of production of pulses is increased or decreased by variations in line frequency.

Also in the present device, in order to eliminate the second above-described disadvantage of the former system, the output of the pulse generator comprises a series of identical groups of pulses the relative amplitude and spacing of the pulses within the group being adjustable by the operator. In this way the output of the pulse generator is made to simulate very closely the random nature of the pulses ordinarily derived from radiation detecting apparatus during normal operation.

Accordingly, it is an object of the present invention to provide a pulse generator accurately simulating the pulses derived from radiation detecting apparatus, such as a Geiger-Muller tube, during normal operation.

It is another object of the invention to provide a pulse generator for producing an accurately known number of pulses in the output.

Still another object of the invention is to provide a pulse generator for producing a series of identical groups of pulses, said pulses being variable as to height and spacing within the groups.

Another object of the present invention is to provide a random pulse generator particularly adaptable for testing counting or scaler circuits.

Still another object of the invention is to provide a pulse generator and a timing circuit therefor both of which are controlled from the same line frequency in such a manner that the total number of pulses produced by the generator is absolutely independent of variations in line frequency.

Other objects and advantages will become apparent from the specification taken in connection with the accompanying drawings wherein one embodiment of the invention is illustrated.

In the drawings, Fig. 1 is a wiring diagram of the pulse generating apparatus itself.

Fig. 2 is a wiring diagram of the power supply and a portion of the output transmission channel for the pulses.

Fig. 3 is a wiring diagram of the associated timing circuit.

Fig. 4 is an illustration of a representative one of the identical groups of pulses, which appear in the output of the present pulse generator, showing the variability with respect to height and spacing which is obtained.

Referring to Figs. 1 and 2, at the left-hand side of Fig. 2 there is shown the power supply for the various electronic circuits. A 60 cycle source 1 energizes the primary winding 2 of the main power transformer 3 through the main power switch 4. The opposing terminals of centrally grounded secondary winding 6 are connected to the respective plates of a full wave rectifier 7, which is preferably type 5Y3. The opposing terminals of a second secondary winding 8 are connected to the cathode of rectifier 7 in the conventional manner. A capacitance-inductance filter arrangement, indicated generally at 9, is provided to smooth out the output of rectifier 7. Power supply B, which may be of the order of 325 volts direct current, is derived from the far side of filter 9. Power supply A, which may be of the order of 60 volts direct current, is derived from a portion of a voltage divider network 11 connected from the filter arrangement 9 to ground. Voltage regulator tubes 12 and 13 are series connected from the far side of the filter arrangement 9 to ground, thus providing regulated power supply C, of the order of 300 volts direct current, and power supply D, of the order of 150 volts direct current. A third secondary winding 14 of transformer 3 has one side grounded and the other side provides about six volts as the tube heater supply E. Power supply E also provides the synchronizing signal for the timing circuit as will later be explained.

Four pulse units, each consisting of one section of duo-diode rectifier tubes 15 and 16, which are preferably type 6H6, and their associated circuits, are provided, each of these pulse units supplying one of the pulses within the identical groups of pulses. These four pulse units are identical except for variations in circuit constants introduced in order to effect the desired variations in the relative height and relative spacing of the pulses within the identical groups. Only the pulse unit comprising the left hand section of rectifier tube 15 will be described in detail.

This pulse unit essentially comprises a voltage divider network connected from a point 5 at the upper terminal of secondary winding 6 to ground. Point 5 is connected first through a resistor 17 from which point a connection is made to ground either through resistor 18 or a resistor 19. From the far side of resistor 19 the voltage divider current may return to ground through the left section of rectifier tube 15, or alternatively it may traverse resistor 20 to a point 26 from which it may return to ground either through a gaseous tube 21, preferably type NE15, or through potentiometer resistor 22 and resistor 23. From point 26 there is still another return circuit to ground, this circuit comprising a differentiating network consisting of variable condensor 24 and resistor 25, the latter resistor being common to all of the four pulse units.

In operation, it will be apparent that during the half cycle when point 5 is positive, the left-hand section of rectifier tube 15 short circuits point 26 to ground, and therefore substantially zero voltage is applied across the differentiating circuit during this half of the cycle. On the negative half cycle, however, the potential of point 26 rises rapidly until such time as the neon tube 21 conducts. The potential of point 26 will then stay constant at the ionization potential of the neon tube until that point in the cycle is reached at which the conduction of the neon tube 21 can no longer be sustained. Accordingly, a negative square wave pulse is applied across the differentiating circuit during the negative half cycle. The portion of the negative half cycle during which the neon tube 21 conducts may be controlled by the setting of the slider of potentiometer 22.

As is well known, when such a negative square wave is applied to the differentiating circuit consisting of variable condenser 24 and resister 25, a highly peaked negative pulse will be produced across resistor 25 at the time when the square wave is initiated and a highly peaked positive pulse will be produced across resistor 25 when the square wave is terminated. The highly peaked positive pulse is the pulse which is actually used and which finally appears in the output of the pulse generator. Adjustment of variable condenser 24 controls the amount of differentiating action effected, and therefore controls the height or amplitude of the peaked pulse. The point of occurrence of the pulse in the negative half cycle of the line frequency is controllable by adjustment of the slider of potentiometer resistor 22 by virtue of its control of the point of termination of the square wave pulse.

In this manner there is produced across resistor 25 four positive pulses, one from each of the four pulse units, for every complete cycle of the line frequency, and these pulses are controllable as to relative height by the relative adjustments of the variable condensers 24 of the respective pulse units, and are controllable as to relative spacing by adjustment of the potentiometer resistors 22 of the respective pulse units.

These positive pulses are then applied to the control grid of an amplifier tube 30, which is preferably type 6AC7, the output of which therefore consists of a corresponding group of negative pulses appearing on its plate. These negative pulses are then further sharpened or intensified by application across a second differentiating circuit consisting of condenser 31 and resistor 32. The resulting intensified negative pulses, which thereby appear across resistor 32, are applied to the control grid of an amplifier tube 33, which is preferably type 6SJ7, and which is used as an electronic gate controlled from the timing circuit, as will later be described in detail. The output of amplifier 33, consisting of highly peaked positive pulses, appearing on its plate, is then resistance-capacitance coupled to the control grid of another amplifier tube 34, preferably type 6SJ7. The negative pulses appearing on the plate of amplifier 34 are then capacitance connected to the negative terminal 35 of selector switch 36. The plate of amplifier tube 34 is also connected to the control grid of amplifier tube 38, which is preferably type 6J5, and the resulting positive pulses which appear on its plate are capacitance connected to the positive terminal 37 of selector switch 35.

The two-section rectifier tube 39, which is preferably type 6H6, is employed to eliminate the kickback, or inverse tail, which might otherwise appear in the output by virtue of the capacitance coupling employed. Thus, the right section of rectifier 39 operates to short circuit the positive tails which would otherwise appear along with the negative pulses produced on terminal 35, and the left section of rectifier 39 operates to short circuit the negative tails which would otherwise appear along with the positive pulses produced on terminal 37.

The negative or positive output pulses, as selected by the position of switch 36, are then capacitance coupled to potentiometer resistor 40, the slider 41 of which is capacitance connected to the output terminal 42 of the pulse generator. In this manner the output of the generator can be made to consist of either positive or negative pulses, as determined by the position of switch 36, and the overall height of the group of pulses can be adjusted by the position of slider 41 of potentiometer 40.

Referring now to Fig. 3, the timing circuit consists essentially of a series of five functionally identical relaxation oscillators, consisting of five thyratron tubes 43, which are preferably type 884, and their associated circuits, amplifier tube 44, which is preferably type 6SL7, and the trigger circuit consisting of tube 45, preferably type 6SN7, and its associated circuit. The essential function of the timing circuit is to control the opening and closing of amplifier gate tube 33 of Fig. 1 by controlling its grid bias potential such that the gate is open for exactly 3,600 cycles of line frequency irrespective of intervening variations in the line frequency. In this manner exactly 3,600 pulses per pulse unit are produced at the output terminal 42 of the pulse generator each time the gate is opened.

Referring to the first of the relaxation oscillators 43, this tube is caused to oscillate at exactly one-third of the line frequency, or at 1200 cycles per "line frequency minute." By "line frequency minute" is meant a minute as measured by the 60 cycle line frequency, that is, the time required for exactly 3,600 cycles of line frequency. It is apparent that this line frequency minute will not be a fixed period of time, but rather will vary with average line frequency, decreasing as the line frequency increases, and increasing as the line frequency decreases.

As is well known, the natural frequency of oscillation of the relaxation oscillator tube 43 is primarily controlled by the plate resistor 46 and the condenser 47 connected from plate to cathode circuit. The natural frequency of oscillation is also determined to some degree by the resistance afforded by potentiometer 48 in its grid circuit. The grid of first oscillator tube 43 is connected to the heater supply voltage source E in order to provide a synchronization signal of line frequency. The circuit constants are of such a value and the potentiometer 48 is adjusted such that the first relaxation oscillator has a frequency of exactly 1200 oscillations per line frequency minute. Accordingly, there will be produced across current limiting resistors 49 exactly 1200 positive pulses per line frequency minute, the pulses occurring each time the tube fires. These pulses are fed to terminal I of selector switch 50, and also to the potentiometer resistor 48 of the subsequent relaxation oscillator circuit to provide a synchronization signal for its grid.

Successive relaxation oscillators have successively larger plate resistors 46 and plate to cathode condensers 47 so that their natural frequency of oscillation will be successively lower. Thus, the second oscillator tube 43 is caused to oscillate at exactly one-eighth of its synchronization frequency, that is, at 150 cycles per line frequency minute. The third, fourth, and fifth relaxation oscillator tubes are designed to oscillate at one-sixth, one-fifth, and one-fourth of their respective synchronization frequencies. Accordingly, the third, fourth, and fifth oscillators oscillate at twenty-five, five, and one oscillations per line frequency minute, respectively. The positive pulses, appearing on the cathode of each of the oscillators 43, are connected to the subsequent oscillator to provide a synchronization signal, and are also connected to the associated terminals of selector switch 50. A sixth unconnected terminal is also provided on switch 50.

From the above-described operation of the oscillators 43, it will be apparent that when selector switch 50 is connected in its number 5 position, exactly one positive pulse per line frequency minute will be applied to the left-hand control grid of amplifier 44. This pulse is inverted in this amplifier and then applied as the negative triggering pulse to the grid of both sections of trigger tube 45.

The thyratron trigger circuit, comprising the two sections of tube 45 and the associated network, is the conventional trigger circuit, as described and explained on page 173 of "Ultra High Frequency Techniques" by Brainerd, Koehler, Reich and Woodruff. As there explained, primarily by virtue of the inter-connection between plate and cathode of opposite sections of the tube, this circuit has two conditions of equilibrium in one of which all of the current is carried by one section of the tube, and in the other of which all of the current is carried by the other section of the tube. The condition of the gate tube 33 is determined by the condition of equilibrium which exists in the trigger circuit, this being true because of the connection from the plate of the right section of trigger tube 45 to the grid of the gate tube 33. When the right section of trigger tube 45 is conducting, the right-hand plate is at a low potential and the bias of the grid of the gate tube 33 is such that the gate is closed. On the other hand when the left section of the trigger tube is conducting, the bias of the grid of the gate tube 33 is at a higher potential and the gate is then open.

The trigger circuit 45 is triggered by the receipt on its two grids of a negative pulse from the plate of the left section of amplifier tube 44. Thus, let us assume that the receipt of one negative pulse at the trigger circuit causes the left-hand section to conduct. The left section will continue to conduct until the receipt of the next negative pulse at the trigger circuit, which pulse will cause the right-hand section to conduct. This section will continue to conduct until the circuit is again triggered by the receipt of another pulse. In view of the fact that one negative pulse is received from amplifier tube 44 for every line frequency minute, it will be apparent that the electronic gate 33 will be successively opened for one line frequency minute and closed for one line frequency minute, and so on.

In addition to the conventional components of the trigger circuit, there is also included in this case a small gas-filled signal lamp 55, connected from the plate of the left section of tube 45 to the positive side of the plate supply voltage. The purpose of this tube is to provide a signal indicating that the left section of the trigger circuit is conducting and therefore that the electronic gate 33 is open. There is also included in the cathode circuit of the left section of the trigger tube 45 a switch 51 which may be used in order to preset the trigger circuit in the condition wherein the right section of tube 45 is conducting and the electronic gate 33 is therefore closed.

Since the timing circuit operates to open electronic gate 33 for exactly one line frequency minute, and since exactly 3600 pulses per pulse unit are generated every line frequency minute, it will be apparent that exactly 3600 pulses per pulse unit will be provided on the output terminal 42 of the apparatus during the time interval that electronic gate 33 is open. In this particular case, since four pulse units have been provided, exactly 14,400 pulses will be produced on the output terminal every time the electronic gate 33 is allowed to open and then close.

A recording circuit comprising the right section of amplifier 44, amplifier 52, which is preferably type 6L6, and mechanical recorder 53 is provided in order to record the number of times the electronic gate is opened. For this purpose a connection is made from the plate of the left section of trigger tube 45 to the grid of right section of the amplifier 44, and the plate of the right section of the amplifier 44 is connected to the grid of amplifier tube 52. Thus, whenever the left section of trigger tube 45 is conducting, and therefore the electronic gate 33 is open, a negative pulse, derived from the plate of the left section of tube 45, is applied to the grid of the right section of tube 44. The resultant positive pulse which appears on the plate of the right section of tube 44 is applied to the grid of amplifier 52 to thereby fire the tube and actuate the recorder 53.

In preparing the apparatus for operation, the timing circuit comprising the oscillators 43 must first be adjusted to operate at their proper frequencies. As has previously been described, the plate resistors 46 and the plate to cathode condensers 47 of the various oscillators have values such that the oscillators will have natural frequencies of the desired order. However, it is desired to adjust potentiometer 48 such that the natural frequency of oscillation of the oscillators will be exactly the desired values.

In order to accomplish this, main power switch 4 is closed and selector switch 50 is first placed in its number one position, in which case the pulses from the first oscillator 43 are applied through the trigger circuit to the recorder 53, the recorder recording only one-half of these pulses by virtue of the division by two in the trigger circuit. A series of timed runs are then made for various positions of potentiometer resistor 48, and the slider of potentiometer resistor 48 is finally positioned in the middle of the range for which the first oscillator synchronizes at the desired frequency of 1200 cycles per minute.

The selector switch 50 is then positioned successfully in positions 2, 3, 4, and 5 and the same procedure is followed in each case. In this way, it is assured that the final oscillator will produce exactly one pulse per line frequency minute.

As a further preparation for operation, the selector switch 50 is placed in its number five position and an oscilloscope is connected to the output terminal 42 of the apparatus to view the output pulses produced. A typical group of output pulses 56 may appear on the oscilloscope screen as shown in Fig. 4. The relative amplitudes of the pulses is then adjusted as desired by proper positioning of variable condensers 24 of the four pulse units. The relative spacing of the output pulses is obtained by adjustment of potentiometer resistors 22. The amplitude of all of the pulses may be adjusted by proper positioning of potentiometer resistor 40. Switch 36 is, of course, positioned as desired to obtain either positive or negative pulses in the output.

The preset switch 51 is then opened to insure that the trigger circuit 45 is operating in the condition wherein the right section of the circuit is conducting and the electronic gate 33 is closed. The counting or scaler circuit under test is then connected to be energized from the output terminal 42 of the apparatus and the count on the counting circuit is reset to zero as for any test. In order to effect the actual test, the preset switch 51 is then closed. After the indicator lamp 55 has gone on and then gone off again, the test may be terminated either by opening preset switch 51 or changing switch 50 to its number 6 position. As previously explained, signal lamp 55 provides an indication that the electronic gate 33 has been opened for exactly one line frequency minute thus allowing exactly 14,400 pulses to be transmitted to the counting apparatus under test.

If longer tests are desired to be made, the mechanical recorder 53 and its associated amplifying circuits may be employed. Thus, selector switch 50 may be held in its number 5 position until any desired multiple of 14,400 pulses have been transmitted to the counter circuit under test, the number of pulses being indicated by the reading of the mechanical recorder 53 multiplied by the factor 14,400.

It will be understood that the number of pulse units shown, namely, 4, has been arbitrarily chosen, and that this number could be increased to any reasonable extent to suit the particular circumstance of the test which it is desired to make.

It is to be understood that all matters contained in the above description and examples are illustrative only and do not limit the scope of this invention as it is intended to claim the invention as broadly as possible in view of the prior art.

I claim:

1. Apparatus for producing an accurately known number of electrical pulses comprising a source of alternating current, pulse generating means responsive to said alternating source for producing a known integral number of pulses per cycle of said alternating source, a transmission channel, including an electronic gate, connected between said generating means and the output of said apparatus for controlling the passage of pulses from said generating means, and means also responsive to said alternating source for opening said gate for a predetermined number of cycles of said alternating source.

2. Apparatus, as claimed in claim 1, wherein said last means comprises a plurality of electronic oscillating circuits adapted to oscillate at successively decreasing frequencies, a synchronizing connection from said alternating source to the input of the first of said oscillators for accurately synchronizing the frequency of said first oscillator at a predetermined fraction of the frequency of said source, additional synchronizing connections from the output of each of said oscillators to the input of the following oscillator for accurately synchronizing the frequency of each of said oscillators at a predetermined fraction of the frequency of the preceding oscillator, and means responsive to the output of the final one of said oscillators for opening said gate for one complete cycle of the final oscillator frequency.

3. Apparatus, as claimed in claim 1, wherein said last named means comprises a plurality of electronic oscillating circuits adapted to oscillate at successively decreasing frequencies, a synchronizing connection from said alternating source to the input of the first of said oscillators for accurately synchronizing the frequency of said first oscillator at a predetermined fraction of the frequency of said source, additional synchronizing connections from the output of each of said oscillators to the input of the following oscillator for accurately synchronizing the frequency of each of said oscillators at a predetermined fraction of the frequency of the preceding oscillator, and means connected between the final one of said oscillators and said gate for alternately opening and closing said gate in response to completion of successive cycles of oscillation of said final oscillator.

4. Apparatus for producing an accurately known number of electrical pulses comprising a source of alternating current, pulse generating means responsive to said alternating source for producing a known integral number of pulses per cycle of said alternating source, a transmission channel, including an electronic gate, connected between said generating means and the output of said apparatus for controlling the passage of pulses from said generating means, and timing means also responsive to said alternating source for alternately opening and closing said gate for a predetermined number of cycles of said alternating source.

5. Apparatus, as claimed in claim 4, wherein said last named means comprises a plurality of electronic oscillating circuits adapted to oscillate at successively decreasing frequencies, a synchronizing connection from said alternating source to the input of the first of said oscillators for accurately synchronizing the frequency of said first oscillator at a predetermined fraction of the frequency of said source, additional synchronizing connections from the output of each of said oscillators to the input of the following oscillator for accurately synchronizing the frequency of each of said oscillators at a predetermined fraction of the frequency of the preceding oscillator, a trigger circuit having two conditions of equilibrium, means responsive to said final oscillator for triggering said trigger circuit in synchronism with said final oscillator frequency, and means connecting said trigger circuit to said gate for holding said gate open for the duration of one condition of equilibrium of said trigger circuit and holding said gate closed for the duration of the other condition of equilibrium of said trigger circuit.

6. A pulse generator comprising a source of alternating current, a plurality of square wave generators responsive to said alternating source for respectively producing a square wave pulse per cycle of said source, a plurality of resistance-capacitance differentiating networks associated respectively with said generators, the resistance element of said networks being common to all networks, and means for applying the square wave pulses from said generators to the associated differentiating networks, whereby a plurality of peaked pulses are produced across said common resistance element per cycle of said source.

7. Apparatus, as claimed in claim 6, wherein the capacitance elements of said respective networks are relatively adjustable to provide a relative adjustment of the amplitudes of said plurality of pulses appearing across said resistance element.

8. A pulse generator comprising a source of alternating current, pulse generating means responsive to said alternating source for producing a group of pulses per cycle of said alternating current, means for varying the relative amplitudes of the pulses within said group, and timing means also responsive to said alternating source for rendering said pulse generating means effective for a predetermined number of cycles of said source.

9. A pulse generator comprising a source of alternating current, pulse generating means responsive to said alternating source for producing a group of pulses per cycle of said alternating current, means for varying the relative amplitudes of the pulses within said group, means for varying the relative spacings of the pulses within said group, and timing means also responsive to said alternating source for rendering said pulse generating means effective for a predetermined number of cycles of said source.

10. A pulse generator comprising a source of alternating current, a plurality of generating means for respectively producing one pulse per cycle of said source, said pulse generating means including means for varying the relative phase of said pulses with respect to said source, means for combining the outputs of said pulse generating means for producing a plurality of pulses per cycle of said source, a transmission channel for said combined output, said channel including an electronic gate, and means also responsive to said alternating source for opening said gate for a predetermined number of cycles of said alternating source.

11. A pulse generator comprising a source of alternating current, pulse generating means responsive to said alternating source for producing a group of pulses per cycle of said alternating current, and means for varying the relative phase of the pulses within said group, and further including timing means also responsive to said alternating source for rendering said pulse generating means effective for a predetermined number of cycles of said source.

ALBERT R. SIMPSON.

REFERENCES CITED

The following references are of record in the file of this patent:

UNITED STATES PATENTS

| Number | Name | Date |
| --- | --- | --- |
| 1,887,237 | Finch | Nov. 8, 1932 |
| 2,029,909 | Cassell | Feb. 4, 1936 |
| 2,132,654 | Smith | Oct. 11, 1938 |
| 2,145,332 | Bedford | Jan. 31, 1939 |
| 2,199,634 | Koch | May 7, 1940 |
| 2,201,162 | Elliott | May 21, 1940 |
| 2,272,070 | Reeves | Feb. 3, 1942 |
| 2,280,707 | Kell | Apr. 21, 1942 |
| 2,418,521 | Morton et al. | Apr. 8, 1947 |

OTHER REFERENCES

Radar Electronic Fundamentals (NAVSHIPS 900,016) Bureau of Ships, Navy Department, June 1944, pages 194–198. (Copy in Div. 51.)